3,590,045
CERTAIN SUBSTITUTED IMIDAZO
(4,5-b) PYRIDINES
Berthold Richard Vogt, King of Prussia, Pa., assignor to
Smith Kline & French Laboratories, Philadelphia, Pa.
No Drawing. Original application May 18, 1967, Ser. No.
639,268. Divided and this application Sept. 25, 1969,
Ser. No. 871,072
Int. Cl. C07d *31/44, 31/46*
U.S. Cl. 260—295
5 Claims

ABSTRACT OF THE DISCLOSURE

Novel 2-acylaminoimidazo [4,5-b] pyridines, which may be optionally substituted on the pyridine nucleus, having activity against helminthiasis in animals are disclosed. A process for their preparation involves reacting an optionally substituted o-diaminopyridine with an acyl-S-lower alkyl pseudothiourea.

This application is a division of application Ser. No. 639,268, filed May 18, 1967 now abandoned.

According to one aspect of the invention, there are provided an anthelmintic composition and method of producing anthelmintic activity which utilizes as the essential active ingredient certain 2-acylaminoimidazo [4,5-b] pyridines represented by the general formula:

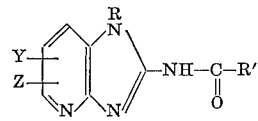

FORMULA I wherein

R is a lower alkyl group containing from one to five carbon atoms, or preferably hydrogen;

R' is alkyl, straight or branched, containing from one to ten carbon atoms; cycloalkyl, including alkyl cycloalkyl, containing from three to ten carbon atoms; alkoxy straight or branched, containing from one to ten carbon atoms; cycloalkoxy, including alkyl cycloalkoxy, containing from three to ten carbon atoms; alkenyl, straight or branched chain, containing from two to ten carbon atoms; alkenyloxy containing from two to ten carbon atoms, alkynyl, straight or branched, containing from two to ten carbon atoms; alkynyloxy containing from two to ten carbon atoms; phenyl; phenyloxy; naphthyl, α or β; or naphthoxy, α or β;

Y and Z are hydrogen, alkyl straight or branched, containing from one to ten carbon atoms; alkoxy, straight or branched, containing from one to ten carbon atoms; phenyl; trifluoromethyl; amino; halogen; preferably chloro or bromo; hydroxy; nitro; alkyl thio; alkylamino; dialkylamino; dialkylaminoalkyl; cyano; acylamino containing from two to seven carbon atoms; carboxy; carbalkoxy containing from two to seven atoms; N-alkylcarbamoyl; or N,N-dialkylcarbamoyl; with the alkyl substituents not specifically defined from one to eight carbon atoms.

It is preferred to use as the actvie ingredient of the novel compositions of this invention, compounds as shown in Formula II below:

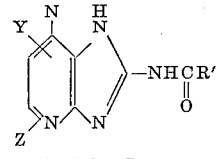

FORMULA II wherein

R' is alkyl, straight or branched, containing from one to seven carbon atoms; cycloalkyl containing from three to seven carbon atoms; alkoxy, straight or branched, containing from one to seven carbon atoms; cycloalkoxy containing from thre to seven carbon atoms; and Y and Z are hydrogen; alkyl, straight or branched, containing from one to eight carbon atoms; alkoxy, straight or branched, containing from one to eight carbon atoms; halogen, phenyl; alkylthio; aminoalkylamino; dialkylamino; dialkylaminoalkyl; hydroxy; carbalkoxy; each alkyl group containing from one to four carbon atoms.

A novel compound within Formula II of exceptional efficacy is imidazo[4,5-b]pyridine-2-carbamic acid, methyl ester, which demonstrates excellent activity against the mouse pinworm at 50 mg./kg.; substantially 100% activity against important sheep nematodes at 50 mg./kg.; and activity against the migratory stages of *Ascaris suum* in mice at 0.05% of the diet.

For brevity, the common name, 2-acylaminoimidazo [4,5-b]pyridine, will be used throughout this disclosure, where acyl is defined herein as including the organic radicals; carbalkyl (RCO), carbalkoxy (ROCO), carbaryl (ArCO) and carbaryloxy (ArOCO); and derivatives thereof substituted on the 6-membered heterocyclic ring.

Position isomers of certain of the compounds of Formula I have been mentioned in the literature but no significant pharmacological activity was attributed to them.

Specifically disclosed in the art are: 7-amido substituted imidazo [4,5-b]-pyridines, and 4-amido substituted imidazo [4,5-c] pyridines by Montgomery et al., J. Med. Chem. 8 (5), 708–10, (1965).

Examples of specific compounds falling within Formula I are:

Imidazo [4,5-b] pyridine-2-carbamic acid, methyl ester
Imidazo [4,5-b] pyridine-2-carbamic acid, n-pentyl ester
Imidazo [4,5-b] pyridine-2-carbamic acid, n-pentyl ester
2-acetamidoimidazo [4,5-b] pyridine
N-{2-imidazo [4,5-b] pyridyl}-cyclopropylcarboxamide
2-acetamidoimidazo [4,5-b]pyridine
N-{2-imidazo [4,5-b] pyridyl}-cyclopropylcarboxamide
2-acetamidoimidazo [4,5-b] pyridine
N-{2-imidazo [4,5-c] pyridyl}-cyclopropylcarboxamide
5-propylimidazo [4,5-b] pyridine-2-carbamic acid, methyl ester
6-methoxy-2-acetamidoimidazo [4,5-c] pyridine
5-chloro-2-acetamidoimidazo [4,5-b] pyridine
6-butoxyimidazo [4,5-c] pyridine-2-carbamic acid, methyl ester
6-butylimidazo [4,5-b] pyridine-2-carbamic acid, n-propyl ester
N-{2 - (4 - phenylimidazo [4,5-c] pyridyl)}-i-propylcarboxamide
6 - dimethylaminoimidazo [4,5-b] pyridine - 2-carbamic acid, n-pentyl ester
N-{2 - (6 - cyanoimidazo [4,5-b] pyridyl)}-i-propylcarboxamide.

It will be readily apparent to one skilled in this art that certain of the substituted fused 2-acylaminoimidazo [4,5-b] pyridine compounds (where R', Y or Z are branched) of this invention may have asymmetric carbon atoms, forming optically active d-and l-compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of derivatives or salts embodying a second resolved optically asymmetric center. Alternatively, a synthesis starting with an optically active side chain may yield the desired optical isomers.

The compounds of Formula I being bases will normally form salts with inorganic and organic acids. Accordingly, the non-toxic salts formed with pharmaceutically acceptable inorganic and organic acids or alkali metal bases may be alternatively employed in the composition of the invention. Other nontoxic molecular complexes known to exist that can be derived from compounds of Formula I may also be used in this invention, since the anthelmintic activity rests in the fused 2-acylaminoimidazo [4,5-b] pyridines structure itself.

The compounds of Formula I in which R is hydrogen R' is acyl can be prepared by treating in a bomb an optionally substituted o-diamino-pyridine with one or two equivalents of a monoacyl or diacyl-S-lower alkylpseudothiourea in an aqueous solution, at a temperature of from 30° C. to 200° C., and at a pH of from 4 to 9 for ten hours to thirty minutes, to give the correspondingly substituted 2 - acylaminoimidazopyridine. The acyl-S-lower alkyl pseudothioureas can be prepared by treating an S-lower alkylpseudothiourea with one to two equivalents of the appropraite acyl halide in a cooled aqueous, alcoholic acetone medium, maintaining the pH at 5 to 9 during the course of the reaction. The acyl S-lower alkylpseudothiourea may be isolated by extraction into a suitable water-immiscible organic solvent, followed by drying and evaporation of the solvent. This method is preferred for the preparation of 2 - carbalkoxy and 2-carbaryloxyaminoimidazo-pyridines.

An alternative process for making novel compounds of this invention involves treating the optionally substituted o-diaminopyridines with the appropriate N-acylcyanamide in an aqueous or alcoholic solution at a temperature of from 30° C. to 200° C. and at a pH of from 4 to 9 hours for 10 hours to 30 minutes, to give the correspondingly substituted 2 - acylaminoimidazo-pyridine. The N-acylcyanamides can be prepared by treating cyanamide with the appropriate acyl halide in a cooled aqueous or alcoholic or acetone medium, in the presence of a base, maintaining the pH at 5 to 9 during the course of the reaction.

The N-acylcyanamide may be isolated by extraction into a water immiscible solvent, followed by evaporation of the solvent.

Another alternative process for making novel compounds of this invention involves treating the optionally substituted o-diaminopyridine with carbon disulfide in the presence of potassium hydroxide in ethanol at from 30° C. to 100° C. for from 10 hours to 30 minutes, alkylating the resultant 2 - thioimidazopyridine with a methyl halide (preferably methyl iodide) in water, maintaining the pH from 6 to 10, heating the resultant 2-methylthioimidazopyridine in an aqueous ammonia solution containing a copper salt and copper alloy catalyst at a temperature of from 50° C. to 250° C. to yield the correspondingly substituted 2 - aminoimidazopyridine. This product can then be treated with an appropriate acyl halide, first in cold pyridine, and then, if necessary the pyridine solution can be heated to give the correspondingly substituted 2-acylaminoimidazopyridine. This method is preferred for the preparation of 2-carbalkoxy and 2-carbarylaminoimidazopyridines.

The o-diaminoheterocycle reactants can have additional substituents on the heterocyclic ring which correspond to Y and Z as defined in Formula I. The resulting imidazoheterocycles bear these substituents at the corresponding position of the 6 membered heterocyclic ring.

The nature of the condensation reactions are such that they are generally applicable to o-diaminoheterocycles regardless of the substituents which may appear on the heterocyclic ring.

The acyl halide reactants can be acyl chloride or acyl bromides, the acyl chlorides being preferred for reasons of availability and cost. The choice of the acyl (eg. R, RO, Ar or ArO) substituted halide is of course dependent upon the particular acyl product desired.

The compounds of Formula II wherein R' is lower alkoxy or lower alkyl can be prepared by subjecting the optionally substituted mono-N-lower alkyl-o-diaminopyridine to the afore-discussed thiourea process, or the afore-discussed carbon disulfide-ammonia-acylhalide process. The mono-N-lower alkyl-o-diaminopyridines can be prepared as follows:

2 - bromo - 3 - aminopyridine is alkylated with a lower alkyl bromide in the presence of sodium hydroxide to give the 3-N-lower alkylamino-2-bromopyridine, which is then heated with ammonia in the presence of copper sulfate to give the 2-amino-3-N-lower alkyl aminopyridine, which is converted by the afore-discussed thiourea, or the carbon disulfideammonia-acyl halide process, to the correspondingly substituted 1-lower alkyl-2-acylaminoimidazo [4,5-b] pyridine.

Starting with an optionally substituted 3 - bromo-2-aminopyridine and following the process described above for the 2-bromo-3-aminopyridine give the correspondingly substituted 3 - lower alkyl - 2 - acylaminoimidazo [4,5-b] pyridine.

The compounds of Formula II where R' is lower alkyl or lower alkoxy, and either of Y or Z is trifluoromethyl, can be prepared by subjecting a trifluoromethyl substituted -o-diaminopyridine to the afore-discussed thiourea process or to the afore-discussed thioures process or to the afore-discussed cyanamide process. The trifluoromethyl-0-diaminopyridine can be made as follows:

o-Diamino-monocarboxylic acid is treated with sulfur trifluoride in hydrogen fluoride to give the correspondingly trifluoromethyl-o-diaminopyridine, which is converted by the afore-discussed thiourea method or the afore-discussed cyanamide method to the correspondingly substituted trifluoromethyl - 2 - acylaminoimidazo [4,5-b or c] pyridine, J.O.C. 27 1406 (62) V 3 p. 315.

The compounds of Formula II where R' is alkenyl, alkenyloxy, alkynyl or alkynyloxy, can be prepared by subjecting the optionally substituted o-diaminopyridine to a reaction with the appropriately substituted alkenyl, alkenyloxy, alkynyl or alkynyloxy carboxyl cyanamide, or to a reaction with the appropriately mono- or di-alkenyl, alkenyloxy, alkynyl or alkynyloxy carbonyl S-lower alkyl pseudothiourea. The substituted cyanamides and thioureas can be prepared as described earlier.

The compounds of Formula II where R' is lower alkyl or lower alkoxy, either one or both of Y or Z are lower alkyl can be prepared by subjecting the appropriate mono- or di-lower alkyl o-diaminopyridine to either the aforementioned thiourea process, or the aforementioned carbon disulfide-ammonia-acyl halide process. The alkylated diamino pyridines can be prepared as follows:

The alkyl pyridines can be prepared by treating the appropriate mono- or di-methylpyridine with sodium amide in ether and liquid ammonia at ca. —50° C. to give the sodium salt followed by the addition of an appropriately substituted alkyl halide (preferably alkyl bromide or alkyl iodide) to give the homologous mono- or di-alkylpyridine.

The 2- and 4-monoalkylpyridines are aminated with sodium or potassium amide in xylene or N,N-dimethylaniline at 80° C. to 140° C. to give respectively the 6-alkyl-2-amino- or 4-alkyl-2-aminopyridine. These intermediate amines are then nitrated with nitric acid in the presence of sulfuric acid to give, initially, the derived nitramide, which is rearranged usually by heating in sulfuric acid, to give a mixture of the 3-nitro and 5-nitro derivatives. This mixture is separated by column chromatography sublimation or steam distillation to furnish the pure 3-nitro-2-aminoalkylpyridines. These latter products are then reduced by catalytic hydrogenation to furnish the correspondingly substituted alkyl-o-diaminopyridine, which can then be cyclized by the aforementioned thiourea process to give the corresponding 5 or 7 monoalkyl substituted 2-acylaminoimidazo-[4,5-b] pyridines.

The 3-monoalkyl pyridines are aminated with sodium or potassium amide in N,N-dimethylaniline, to give a mixture of the 2-amino-3-alkyl and 2-amino-5-alkylpyridines, which are separated by distillation or preparative vapor phase chromatography. The purified 5-alkyl-2-aminopyridine is then nitrated with fuming nitric acid in the presence of sulfuric acid to give the 5-alkyl-2-nitraminopyridine which is warmed in sulfuric acid to give the 5-alkyl-2-amino-3-nitropyridine which can then be reduced by catalytic hydrogenation to give the 5-alkyl-2,3-diaminopyridine. This o-diaminopyridine can then be converted by the afore-discussed thiourea process or the afore-discussed carbon disulfide-ammonia-acyl halide process to the correspondingly 6-mono-alkyl substituted 2-acylaminoimidazo[4,5-b]pyridine.

Dialkyl substituted 2-acylaminoimidazo[4,5-b]pyridines can be prepared by subjecting the appropriately substituted dialkylpyridine to one of the appropriate afore-discussed procedures.

The compounds of Formula II in which R' is lower alkyl or lower alkoxy, Y is dialkylamino, and Z is hydrogen, can be prepared by subjecting the appropriately substituted dialkylamino-o-diaminopyridine to the afore-discussed thiourea process or to the carbon disulfide-ammonia-acyl halide process. The dialkylamino-o-diaminopyridine can be made as follows: The 5-chloro-2-aminopyridine is nitrated with nitric acid in the presence of sulfuric acid to give the 5-chloro-3-nitro-2-aminopyridine which is reduced with stannous chloride in hydrochloric acid to give the 5-chloro-2,3-diaminopyridine. This latter intermediate is heated with the appropriate dialkylamine in the presence of copper sulfate to give the 5-N,N-dialkyl-amino - 2,3 - diaminopyridine which is converted by the afore-discussed thiourea method to the correspondingly 6 - N,N - dialkylamino substituted 2-acylaminoimidazo [4,5-b]pyridine.

The compounds of Formula II wherein R' is lower alkyl or lower alkoxy, Y is alkoxy, Z is hydrogen, and X is nitrogen can be prepared by subjecting the appropriately substituted alkoxy-o-diaminopyridine to the afore-discussed thiourea or carbon disulfide process. The alkoxy-o-diaminopyridines can be prepared as follows: 6-hydroxy-2-acetamidopyridine is alkylated with the appropriate lower alkyl halide in the presence of potassium hydroxide to give the 6-alkoxy-2-acetamidopyridine which is nitrated with nitric acid in the presence of sulfuric acid to give a mixture of the 3-nitro and 5-nitro-6-alkoxy-2-aminopyridines. The desired 6-alkoxy-3-nitro-2-aminopyridine is obtained pure by column chromatography and then hydrogenated catalytically preferentially with palladium to give the 6-alkoxy-2,3-diaminopyridine. This latter intermediate is then converted by the afore-discussed thiourea method or carbon disulfide-ammonia-acyl halide method to the correspondingly 5-alkoxy substituted 2-acylaminoimidazo[4,5-b]pyridine.

3,5-dinitro-2-aminopyridine is catalytically hydrogenated to give 2,3,5-triaminopyridine which is converted by the aforediscussed thiourea method to the 6-amino-2-acylaminoimidazo[4,5-b]pyridine. This latter intermediate is treated with the appropriate alcohol-alkyl nitrate mixture containing one equivalent of mineral acid to give the correspondingly substituted 6-alkoxy-2-acylamino-imidazo[4,5-b]pyridine.

The 4-chloropyridine - 2,6 - dicarboxylic acid dimethyl ester is heated with the appropriate alcoholic sodium alkoxide to give the 4-alkoxypyridine-2,6-dicarboxylic acid dimethyl ester which is refluxed with two equivalents of hydrazine hydrate in ethanol to give the 4-alkoxypyridine-2,6-dicarboxylic acid dihydrazide. This latter intermediate is treated with ethanolic sodium nitrite and dilute hydrochloric acid to give the 4-alkoxy-2,6-dicarbethoxy-amido-pyridine which is refluxed with aqueous ethanolic potassium hydroxide to give the 4-alkoxy-2,6-diaminopyridine. This latter intermediate is nitrosated with sodium nitrite and aqueous acetic acid to give the 4-alkoxy-2,6-diamino-3-nitrosopyridine, which is reduced with hydrogen sulfide in water to give the 4-alkoxy-2,3,6-triaminopyridine. This latter intermediate is converted by the afore-discussed thiourea method to the 5-amino-7-alkoxy-2-acylaminoimidazo[4,5-b]pyridine which is deaminated by treatment with sodium nitrite in cold dilute hydrochloric acid followed by cold dilute hypophophorous acid to give the 7-alkoxy-2-acylamino-imidazo[4,5-b]pyridine.

The compounds of Formula II wherein R' is lower alkyl or lower alkoxy, and Y and Z are both alkoxy can be prepared by subjecting the appropriately substituted dialkyl-o-diaminopyridine to the afore-discussed thiourea process or the carbon disulfide-ammonia-acyl halide process. The dialkoxy-o-diaminopyridines can be made as follows:

5,6-dihydroxypicoline is treated with the appropriate diazoalkane in ethanol to give the 5,6-dialkoxy-picoline which is then nitrated with nitrice acid in the presence of sulfuric acid to give the 5,6-dialkoxy-3-nitro-picoline. This latter intermediate is oxidized with potassium permanganate to give the 5,6-dialkoxy-3-nitropyridine-1-carboxylic acid which is then treated with thionyl chloride to give the 3-nitro-5,6-dialkoxy pyridine. This latter intermediate is hydrogenated with palladium to give the 5,6-dialkoxy-2,3-diaminopyridine which is converted by the afore-discussed thiourea method to the correspondingly substituted 5,6-dialkoxy - 2 - acylaminoimidazo-[4,5-b] pyridine.

The 2-acylaminoimidazo[4,5-b]pyridines of Formula I, have been found to possess useful anthelmintic properties, that is, broad spectrum activity against parasites of warm blooded animals, including both mature and immature parasitic forms. In particular, these compounds have been found to exhibit high activity against various helmintic infections of the intestinal tract of economically important animals, coupled with low systemic toxicity to the host animal.

For example, the disclosed compounds are generally effective in clearing mice of worm infection for laboratory purposes, among others: *Syphacia obvelata* and *Aspicularis tetraptera* (mouse pinworm), *Nematospiroides dubius* (mouse hookworm), and the migratory stages of *Ascaris suum*.

Other susceptible helminths include *Toxocara canis*, found in naturally infested dogs. Also, parasitic to this host are *Ancylostoma canium*, *Trichuris vulpis* (whipworm), and Physalaptera spp.

Compounds of Formula I have been demonstrated as efficacious against parasites of pigs, such as the migratory stages of *Ascaris summ*, thus preventing the development of verminous pneumonia. Matastrongylus supp. Oseophagostomum supp., Trichutis supp., and Strongyloides spp., are important parasites of swine.

Compounds of Formula I have also been demonstrated as efficacious against parasitic gastroenteritis in sheep, such as Haemonchus contortus, Ostertagia spp., Trichostrongylus spp., Nematodirus spp., Trichuris ovis., Cooperia spp., Shabertia spp., and Strongyloides papillosus. Bunostomum trigonocephalum, Oesophagostomum spp., Dictoycaulus filaria, spp. are other important parasites.

Cattle have many parasites in common with sheep. For example, an important helminth of cattle is *Dictyocaulus viviparus*.

Animals of low weight are treated with unit doses ranging no higher than a few milligrams; whereas animals of high body weight, such as ruminants, require proportionately large unit doses ranging up to several grams.

Preferably, a single dose is administrated daily for each animal species based on the weight of that species.

The amount of ingredient administered will depend on the weight of the host, but will usually be between about 1 mg./kg. and 500 mg./kg. of body weight daily.

In practice, a pharmacologically active compound of structural Formula I is usually formulated with a nontoxic carrier therefor to give anthelmintic compositions of this invention. The carrier may be an orally ingestible container for the active ingredient, for example, a hard or soft gelatin capsule; or it may be a pharmacutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 mg. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus, for the preferred oral administration, the dosage unit may take the form of a suspension, tablet, capsule, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 1 mg./kg. to about 500 mg./kg. depending on the species of host and regimen used. One dose per day administration is preferred but up to five of the dosage units described above may be used if desired.

Where tableting is used, the resulting tablets are then coated with methyl methacrylate to form an enteric coating, i.e. a coating which is substantially insoluble in gastric secretion but substantially soluble in intestinal fluids.

It will be appreciated that the active ingredient used in the formulation of the tablets described above may be replaced with other compounds of Formula I having the necessary anthelmintic activity. Furthermore, other materials may be used to form the enteric coating, for example other synthetic plastic materials such as methyl acrylate, cellulose derivatives, hydrogenated caster oil or phthalates.

The compositions thusly prepared are administered, usually orally, to an infected host from 1–5 times daily for anthelmintic activity.

The following examples illustrate syntheses which may be employed in formulating the compositions of the invention but are not considered limiting the invention described herebefore.

EXAMPLE 1

Preparation of imidazo [4,5-b] pyridine-2-carbamic acid, methyl ester

To a stirred solution of 70 g. of 2-methylthiopseudourea sulfate in 300 ml. of $H_2O$, cooled in an ice-water bath, is added 100 g. of methyl chloroformate. A solution of 70 g. of sodium hydroxide in 200 ml. of $H_2O$ is added at such a rate that the temperature of the reaction mixture does not exceed 15° C. After addition is completed, the reaction mixture is stirred for an additional 20 minutes, and then is extracted with chloroform. The chloroform extracts are dried, and the solvent is removed, leaving the 2-methyl-thiopseudourea-1,3-dicarboxylic acid, dimethyl ester. In a glass bomb is added 6 7g. of 2-methyl-thiopseudourea-1,3-dicarboxylic acid dimethyl ester, 30 g. of 2,3-diaminopyridine, 150 ml. of $H_2O$, and 45 ml. of acetic acid. The bomb is sealed, and the reaction mixture is heated at 130° C. for 4 hours in an oil bath. At the end of this time, the reaction vessel is cooled in an ice-water bath and the resultant product was filtered off. The material is dissolved in dilute aqueous HCl, charcoaled, filtered and the pH is adjusted to 7. The product is filtered off dried, and recrystallized from dimethylformamide, some insoluble material is filtered off at this point. The resultant precipitate was dissolved in dilute aqueous NaOH, charcoaled, filtered, and the pH is adjusted to 7. The product is filtered off and dried in vacuo, M.P.=272–276° C. (dec.).

EXAMPLE 2

Preparation of 5-methylimidazo [4,5-b] pyridine-2-carbamic acid, methyl ester

To a stirred, cooled volume (130 ml.) of concentrated sulfuric acid is added 75 g. of 6-methyl-2-aminopyridine at such a rate that the reaction temperature did not exceed 20° C. A 102 ml. mixture of concentrated sulfuric acid and nitric acid (1:1) is added dropwise, maintaining the temperature below 20° C. The reaction mixture is stirred for 1 hour with cooling, then warmed carefully to 40° C. This temperature is maintained for two hours. The reaction mixture is poured onto ice, made alkaline with concentrated $NH_4OH$, and the precipitated mixture of 5-nitro - 6 - methyl - 2 - aminopyridine and 3-nitro-6-methyl-2-aminopyridine is collected. Chromatography of this mixture in ethyl acetate-cyclohexane (9:1 by volume) on basic alumina (3" x 22" column) results in the separation of the two isomers, with the desired 3-nitro-6-methyl-2-aminopyridine eluting first. The eluted solvent is stripped, leaving 3 - nitro - 6 - methyl - 2 - aminopyridine, M.P.=154–155° C.

15.3 g. of 3-nitro-6-methyl-2-aminopyridine and 1.5 g. of 10% palladium on charcoal are added to 500 ml. ethyl acetate. This reaction mixture is hydrogenated for 4 hours at 50 p.s.i. hydrogen pressure. The catalyst is filtered off, and the solvent is evaporated in vacuo, leaving 2,3-diamino-6-methylpyridine, M.P.=72–74° C.

The 2,3-diamino-6-methylpyridine is reacted as described for 2,3-diamino-pyridine in Example 1 to give 5-methylimidazo [4,5-b] pyridine-2-carbamic acid, methyl ester, M.P. 270–275° C. (dec.).

EXAMPLE 3

Preparation of 7-propylimidazo [4,5-b] pyridine-2-carbamic acid, methyl ester

A mixture of 55 g. of sodium amide and 145 g. of 4-n-propylpyridine in 210 ml. of xylene is heated at 135° C. for 6 hours under a oneway exit valve. The reaction mixture is cooled to room temperature, diluted with ether and poured onto ice. The two phase system was acidified with aqueous HCl, the aqueous phase is separated and the organic layer is washed with dilute aqueous HCl. The aqueous extracts are made alkaline with 40% aqueous NaOH, the organic phase is removed, and the aqueous phase is extracted with ether. These latter organic phases are combined, dried, and the filtrate is distilled in vacuo. Solvent and starting alkylpyridine are distilled off first, followed by the intermediate, 4-n-propyl-2-aminopyridine, which is converted to its 2,3-diamino analog.

Using the procedures described in Example 3, the desired product can be prepared starting with the just prepared 4-n-propyl-2,3-diaminopyridine.

EXAMPLE 4

Preparation of 6-butylimidazo [4,5-b] pyridine-2-carbamic acid methyl ester

To a mixture of 200 ml. of anhydrous ether and 200 ml. of anhydrous liquid ammonia at 58°, is added, dropwise over a 25 minute period 140 g. of 3-methylpyridine. The reaction mixture is refluxed for 2.5 hours. 230 g. of n-propyl bromide is added dropwise over a 70 minute period, and the solution is then stirred at reflux for 1 hour. The reaction vessel is allowed to warm up overnight to room temperature, permitting the liquid ammonia to boil off. To this mixture is then added 79 g. of ice, followed by 200 ml. of $H_2O$. The two phase system is stirred, separated, and the organic phase is washed with $H_2O$. After drying, the solution is distilled in vacuo, removing solvent in the forerun, followed by 3-n-butylpyridine, B.P.=80° C. at 7 mm.

3-n-butylpyridine was aminated by the procedure described above to give a mixture of 3-n-butyl-2-aminopyridine and 5-n-butyl-2-aminopyridine which is separated by preparative gas-liquid chromatography. The purified 5-n-butyl-2-aminopyridine is then subjected to the procedure described in Example 1 to give 5-n-butyl-2,3-diaminopyridine and thence to the desired product.

EXAMPLE 5

Preparation of imidazo [4,5-b] pyridine-2-carbamic acid, n-propyl ester

Using the procedure described in Example 1, the desired product may be prepared from the sulfate named therein n-propyl chloroformate and 2,3-diaminopyridine, M.P.=310–315° C. (dec.).

EXAMPLE 6

Preparation of imidazo [4,5-b] pyridine-2-carbamic acid, n-pentyl ester

Using the procedure described in Example 1, the desired product may be prepared from the sulfate named therein, n-pentyl chloroformate and 2,3-diaminopyridine, M.P.=234–235° C. (dec.).

EXAMPLE 7

Preparation of N-(2-imidazo (4,5,-b] pyridyl) cyclopropylcarboxamide

To a stirred, cooled solution of 9.2 g. of cyanamide and 23.4 g. of cyclopropylcarbonyl chloride in 100 ml. of dry tetrahydrofuran is added, in a dropwise manner, 23 g. of triethylamine. After stirring for 20 minutes, the reaction mixture is diluted with an aqueous sodium sulfate solution and extracted with ether. The ether extracts are washed with aqueous sodium hydroxide, dried and the solvent is evaporated, leaving ca. 9.7 g. of crude cyclopropylcarbonyl cyanamide.

This cyanamide is heated in a glass bomb with 13.4 g. of 2,3-diaminopyridine in 65 ml. of ethanol containing 7.5 ml. of acetic acid at 160° for 2 hours. The reaction mixture is allowed to gradually cool to room temperature. The resultant precipitate is filtered off, dissolved in dilute aqueous hydrochloric acid and charcoaled; the solution is filtered and neutralized to pH 7 with aqueous sodium hydroxide. The resultant precipitate is dissolved in ethanolic aqueous sodium hydroxide, charcoaled, the solution is filtered and neutralized to pH 7 with dilute aqueous hydrochloric acid. The precipitated is filtered off and dried in vacuo, M.P.=308–310° C.

EXAMPLE 8

Preparation of substituted imidazo [4,5] pyridine-2-carbamic acid, methyl esters When the following substituted o-diaminopyridines and o-diaminopyrimidines are substituted for the o-diaminopyridine used in the procedure of Example 1, the corresponding listed products are obtained.

| Starting material | Product |
| --- | --- |
| 2,3-diamino-4-butylpyridine | 7-butylimidazo [4,5-b] pyridine-2-carbamic acid, methyl ester. |
| 2,3-diamino-5-butylpyridine | 6-butylimidazo [4,5-b] pyridine-2-carbamic acid, methyl ester. |
| 2,3-diamino-6-butylpyridine | 5-butylimidazo [4,5-b] pyridine-2-carbamic acid, methyl ester. |
| 2,3-diamino-5-propylpyridine | 6-propylimidazo [4,5-b] pyridine-2-carbamic acid, methyl ester. |
| 2,3-diamino-6-ethylpyridine | 5-ethylimidazo [4,5-b] pyridine-2-carbamic acid, methyl ester. |
| 2,3-diamino-5-methylpyridine | 6-methylimidazo [4,5-b] pyridine-2-carbamic acid, methyl ester. |
| 2,3-diamino-5-butoxypyridine | 6-butoxyimidazo [4,5-b] pyridine-2-carbamic acid, methyl ester. |
| 2,3-diamino-5-chloropyridine | 6-chloroimidazo [4,5-b] pyridine-2-carbamic acid, methyl ester. |
| 2,3-diamino-6-dimethylamino-pyridine. | 5-dimethylaminoimidazo [4,5-b] pyridine-2-carbamic acid, methyl ester. |
| 2,3-diamino-5-trifluoromethyl-pyridine. | 6-trifluoromethylimidazo [4,5-b] pyridine-2-carbamic acid, methyl ester. |
| 2,3-diamino-5-carbomethoxy-pyridine. | 6-carbomethoxyimidazo [4,5-b] pyridine-2-carbamic acid, methyl ester. |
| 2,3-diamino-5,6-dibutylpyridine. | 5,6-dibutylimidazo [4,5-b] pyridine-2-carbamic acid, methyl ester. |
| 2,3-diamino-5,6-dipropoxypyridine. | 5,6-dipropoxyimidazo [4,5-b]pyridine-2-carbamic acid, methylester. |

EXAMPLE 9

Preparation of substituted imidazo [4,5] pyridine-2-carbamic acid, esters thereof When the following substituted o-diamines and haloformates are substituted respectively for the o-diaminopyridine and methyl chloroformate used in the procedure of Example 1, the corresponding listed products are obtained:

| o-Diamine | Maloformate | Product |
| --- | --- | --- |
| 2,3-diamino-5-butyl-pyridine. | Allyl chloroformate. | 6-butylimidazo (4,5-b) pyridine-2-carbamic acid, allyl ester. |
| 2,3-diamino-6-butyl-pyridine. | 2-methallylchloroformate. | 5-butylimidazo (4,5-b) pyridine-2-carbamic acid, 2'-methylallyl ester. |
| 2,3-diamino-4-propyl-pyridine. | Cyclobutylchloroformate. | 7-propylimidazo (4,5-b) pyridine-2-carbamic acid, cyclobutyl ester. |
| 2,3-diamino-4-methyl-pyridine. | 1-naphthyl chloroformate. | 7-methylimidazo (4,5-b) pyridine-2-carbamic acid, 1-naphthyl ester. |
| 2,3-diamino-6-butoxy-pyridine. | Phenylchloroformate | 5-butoxyimidazo (4,5-b) pyridine-2-carbamic acid, phenyl ester. |
| 2,3-diamino-5-methoxypyridine. | i-Propyl chloroformate. | 6-methoxyimidazo (4,5-b) pyridine-2-carbamic acid, i-propyl ester. |
| 2,3-diamino-6-octyloxypyridine. | 3-methylpentyl chloroformate. | 5-octyloxyimidazo (4,5-b) pyridine-2-carbamic acid, 3'-methylpentyl ester. |
| 2,3-diamino-6-bromo-pyridine. | n-Heptyl chloroformate. | 5-bromoimidazo (4,5-b) pyridine-2-carbamic acid n-heptyl ester. |

EXAMPLE 10

Preparation of substituted N-(2-imidazo [4,5] pyridyl)-carboxamides

When the following substituted o-diamines and carboxylic acid halides are substituted, respectively, for the o-diaminopyridine and chloride used in the procedure of Example 2 or 7, the corresponding listed products are obtained:

| o-Diamine | Acid halide | Product |
|---|---|---|
| 2,3-diamino-5-butyl-pyridine. | Allyl carbonyl chloride. | N-{2-(6-butylimidazo (4,5-b) pyridyl)}-allyl carboxamide. |
| 2,3-diamino-6-butyl-pyridine. | 2-methallyl carbonyl chloride. | N-{2-(5-butylimidazo (4,5-b) pyridyl)}{-2-methylallyl} carboxamide |
| 2,3-diamino-4-propyl-pyridine. | Cyclobutyl carbonyl chloride. | N-{2-(7-propylimidazo (4,5-b) pyridyl)}{-cyclobutyl} carboxamide. |
| 2'3-daimino-4-methyl-pyridine. | 1-naphthoyl chloride | N-{2-(7-methylimidazo (4,5-b) pyridyl)}{-naphthamide. |
| 2,3-diamino-6-butoxy-pyridine. | Benzoyl chloride | N-{2-(5-butoxyimidazo (4,5-b) pyridyl)}{-benzamide. |
| 2,3-diamino-5-methoxypyridine. | i-Butyryl chloride | N-{2-(6-methoxyimidazo (4,5-b) pyridyl)}{-i-butyramide. |
| 2,3-diamino-6-octyloxypyridine. | 3-methylhexanoyl chloride. | N-{2-(5-oxtyloxyimidazo (4,5-b) pyridyl)}{-3'-methylhexanamide. |
| 2,3-diamino-6-bromo-oxypyridine. | Octanoyl chloride | N-{2-(5-bromoimidazo (4,5-b) pyridyl)}{-octanamide. |
| 2,3-diamino-4-butyl-pyridine. | Acetyl chloride | N-{2-(butylimidazo (4,5-b) pyridyl)}{-acetamide. |

EXAMPLE 11

When the following substituted o-diamines are substituted for the 2,3-diamino-n-butyl pyridine used in the procedure of Example 4, the corresponding listed products are obtained:

| Starting material | Product |
|---|---|
| 2,3-diamino-4-butylpyridine | N-{2-(7-butylimidazo [4,5-b] pyridyl)}-cyclopropylcarboxamide. |
| 2,3-diamino-5-butylpyridine | N-{2-(6-butylimido [4,5-b] pyridyl)}-cyclopropylcarboxamide. |
| 2,3-diamino-6-butylpyridine | N-{2-(5-butylimida,o [4,5-b] pyridyl)}-cyclopropylcarboxamide. |
| 3,4-diamino-5-propylpyridine | N-{2-(7-propylimidazo [4,5-b] pyridyl)}-cyclopropylcarboxamide. |
| 2,3-diamino-6-ethylpyridine | N-{2-(5-ethylimidazo [4,5-b] pyridyl)}-cyclopropylcarboxamide. |
| 2,3-diamino-5-methylpyridine | N-{2-(6-methylimidazo [4,5-b] pyridyl)}-cycloropylcarboxamide. |
| 2,3-daimino-5-butoxypyridine | N-{2-(6-butoxyimidazo [4,5-b] pyridyl)}-cyclopropylcarboxamide. |
| 2,3-diamino-5-chloropyridine | N-{2-(6-chloroimidazo [4,5-b] pyridyl)}-cyclopropylcarboxamide. |
| 2,3-diamino-6-dimethylamino-pyridine. | N-{2-(5-dimethylaminoimidazo [4,5-b] pyridyl)}-cyclopropylcarboxamide. |
| 2,3-diamino-5-trifluoromethyl-pyridine. | N-{2-(6-trifluoromethylimidazo [4,5-b] pyridyl)}cyclopropylcarboxamide. |
| 2,3-diamino-5-carbomethoxy-pyridine. | N-{2-(6-carbomethoxyimidazo [4,5-b] pyridyl)}-cyclopropylcarboxamide. |
| 2,3-daimino-5,6-dibutylpyridine. | N-{2-(5,6-dibutylimidazo [4,5-b] pyridyl)}-cyclopropyl. |
| 2,3-diamino-5,6-dipropoxy-pyridine. | N-{2-(5,6-dipropoxyimidazo 4,b-5] pyridyl)}-cyclopropylcarboxamide. |

EXAMPLE 12

Typical cattle bolus containing an anthalmintric described herein

| | Grams |
|---|---|
| Imidazo [4,5-b] pyridine-2-carbamic acid, methyl ester | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried materials then passed through a #16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acaia are of a particle size to pass a #10 mesh screen.

The above solid components are thoroughly mixed, giving a water dispersable powder. This powder can be directly admixed with water in concentrations on the order of 5 g. of powder to 5 cc. of water.

EXAMPLE 13

Novel sheep drench containing an anthelmintic carbamate

| | Parts by weight |
|---|---|
| Imidazo-[4,5-b]pyridine-2-carbamic acid, propyl ester | 60 |
| Terra Alba English | 16 |
| Methyl cellulose | 1 |
| Polyethylene glycol (Methocel 4000) | 20 |
| Antifoam AF[1] | 3 |

[1] Silicone emulsion supplied by Dow Chemical Co.

The above ingredients are suspended, one part powdered mixture to four parts water, and spray dried as is well known in the art.

EXAMPLE 14

Novel sheep drench containing an anthelmintic carbamate

| | Parts by weight |
|---|---|
| Imidazo-[4,5-b] pyridine-2-carbamic acid, propyl ester | 80.0 |
| Polysorbate 80, U.S.P. | 6.0 |
| Instant Clear Gel, National Starch | 12.0 |
| Supercol-U-guargum, General Mills | 2.0 |

The above solid components are thoroughly mixed, giving a water dispersable powder. This powder can be directly admixed with water in concentrations on the order of 50 g. of powder to 16 oz. of water.

What is claimed is:

1. A 2-acrylamino imidazo [4,5-b] pyridine having the following formula

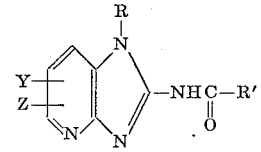

wherein R' is selected from the group consisting of alkyl having 1–8 carbon atoms, alkory having 1-8 carbon atoms, cycloalkyl having 3 or 4 carbon atoms, allyl and methallyl; R is hydrogen; Y and Z are selected from the group consisting of hydrogen, alkyl having 1–8 carbon atoms alkoxy having 1–8 carbon atoms, halogen, trifluoromethyl, cyano, dimethylamino and carboloweralkoxy with a proviso that at least one of said terms Y or Z represents hydrogen, except when Y or Z represent lower-alkyl and lower-alkoxy.

2. A compound according to claim 1 wherein R is hydrogen and R' is lower-alkyloxy.

3. A compound according to claim 1 wherein R, Y and Z are all hydrogen, and R' is methoxy.

4. A compound according to claim 1 wherein R, Y and Z are all hydrogen, and R' is propoxy.

5. A compound according to claim 1 wherein R, Y and Z are all hydrogen, and R' is cyclopropyl.

References Cited

UNITED STATES PATENTS 3,336,191    3/1966    Craig et al. _____ 424—273

OTHER REFERENCES

Montgomery et al.: J. Med. Chem., vol. 8 (5), pp. 708–101 (1955).

ALAN L. ROTMAN, Primary Examiner

U.S. Cl. X.R.

260—294.9; 424—266